Jan. 10, 1967  I. R. SHERMAN  3,297,237
BYPASS CORE DUCTED FAN WITH INNER AND OUTER
PERIPHERAL BEARINGS

Filed Feb. 5, 1965  4 Sheets-Sheet 1

*INVENTOR*
IRVING R. SHERMAN

BY *James H. Littlepage*
ATTORNEY

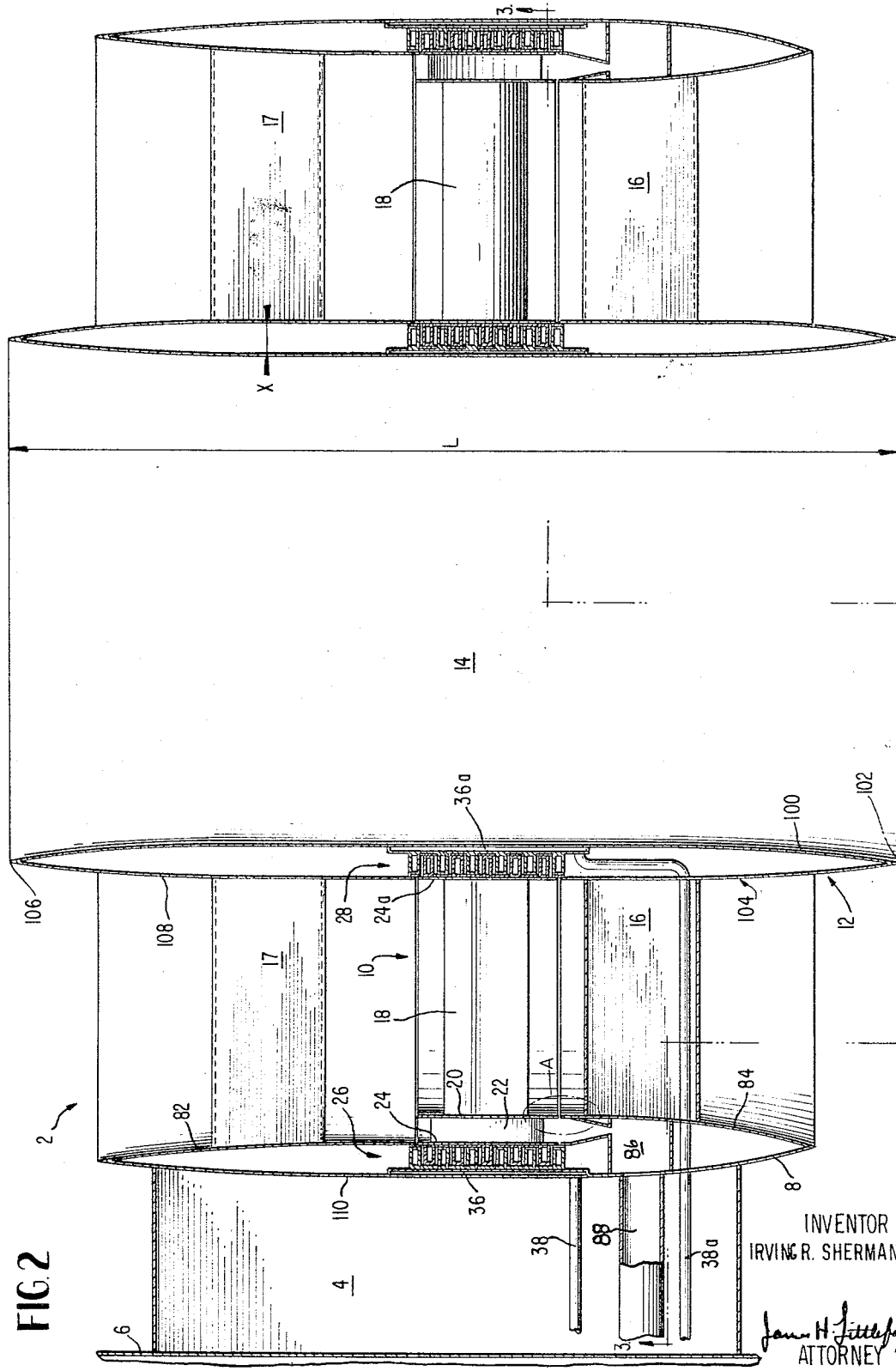

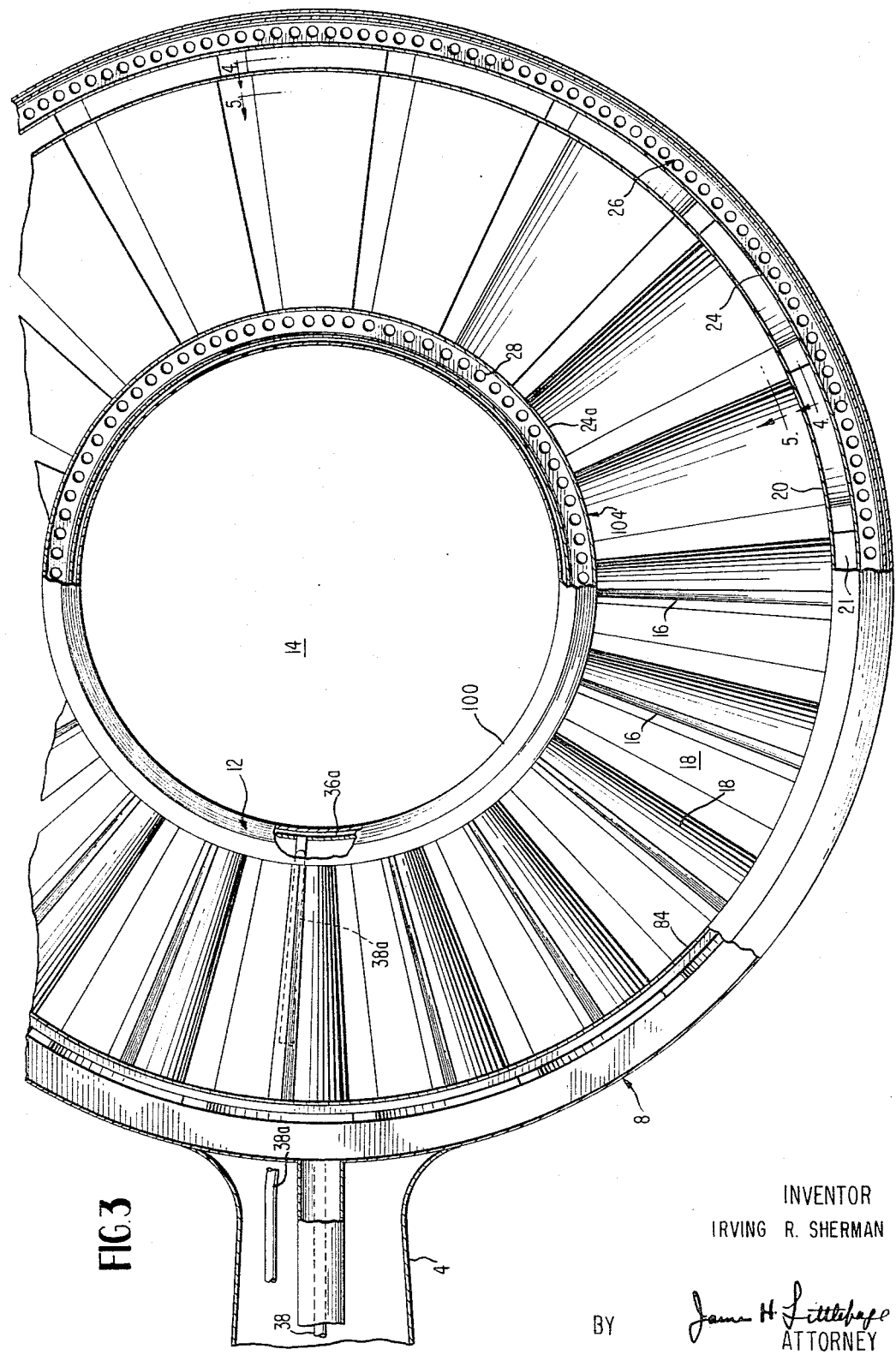

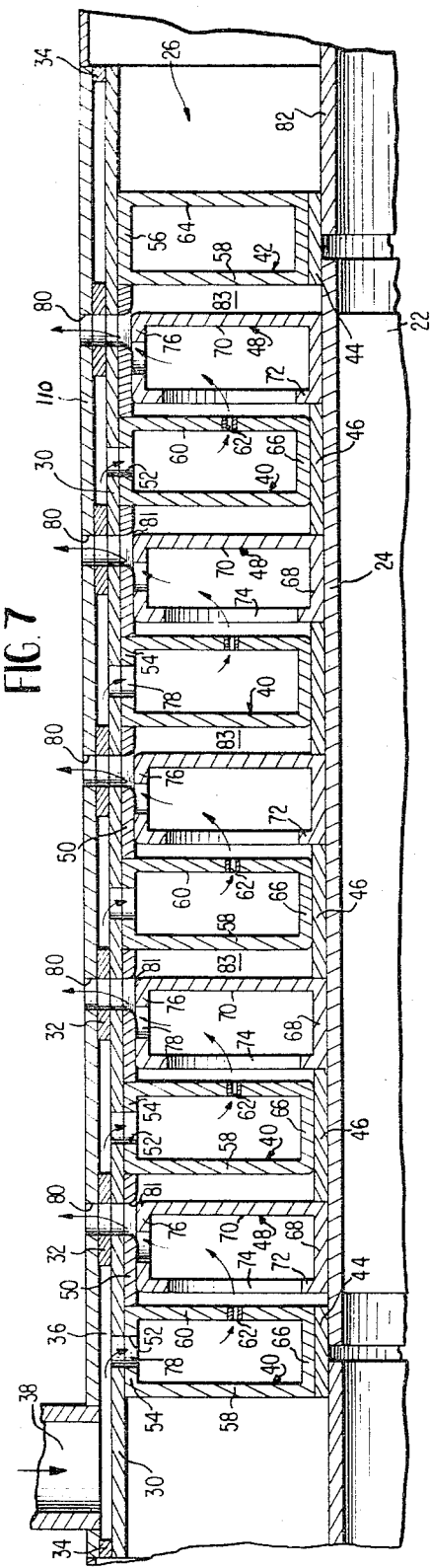

United States Patent Office 3,297,237
Patented Jan. 10, 1967

3,297,237
BYPASS CORE DUCTED FAN WITH INNER AND
OUTER PERIPHERAL BEARINGS
Irving R. Sherman, 131 Magazine St.,
Cambridge, Mass. 02140
Filed Feb. 5, 1965, Ser. No. 430,528
11 Claims. (Cl. 230—116)

This invention relates to aircraft propulsion means having tip-turbine drivers around the periphery thereof. Related applications filed concurrently herewith by me are entitled Bypass Ducted Fan With Outer Peripheral Bearing and Gas Bearing.

Typical ducted fans over which this invention constitutes an improvement are shown in the patents to Ferri 3,018,034, Kent 3,070,284 and Tharp 3,132,842, wherein fan blades radiate from a hub nacelle. Even though the nacelle be streamlined, it imposes a drag on the air flowing through the fan. For a streamlined body such as a nacelle, drag depends essentially upon finesse ratio which, generally speaking, is the diameter at the largest cross-section divided by the length. Design considerations impose certain practical design limitations upon the diameter and length of nacelles. If attempt be made to reduce the finesse ratio by reducing the diameter of the nacelle at the point of greatest cross section, which is where the inner ends of the fan blades terminate, then the blade density and overlap of the inner blade ends becomes such as to produce drag or shock at high subsonic and supersonic speeds. The inner ends of the blades must be thick enough to provide a strong connection with the nacelle, and taking into account the necessary chord length and blade pitch, the inner portion of a fan with a nacelle restricts the flow of air and takes on some characteristics of a wall when high subsonic air speeds are reached. In fact, it is demonstratable that under certain conditions the inner portions of a fan exert forces opposite to those desired. Thus, with an ordinary ducted fan with a nacelle, assuming a blade pitch of from 12° to 16° at the tips and perhaps as high as 75° at the hub, the thrust of the blades near the hub is sidewise at low speeds, which opposes the torque force rotating the fan. Hence, the inner portions of the blades are not only useless, but together with the drag of the nacelle, results in a relatively inefficient device. A finesse ratio of less than 10% is considered suitable for high subsonic or supersonic speeds, whereas nacelles with a finesse ratio greater than 10% are considered thick and suitable only for low and medium speeds (up to about 450 m.p.h.), and the above-noted limitations make it impractical to attain finesse ratios of less than 10%. One of the objects of the invention is to provide a ducted fan having the inner ends of the blades connected by a structure having a finesse ratio of less than 10%. It is proposed now to provide a ducted fan having the inner ends of the blades connected and radiating from a hollow, generally cylindrical body hereinafter referred to as a "hollow core." Since the cross-sectional thickness of the hollow core wall need not be large as compared to the depth of the cylindrical duct, a very favorable finesse ratio is attained.

Of as great or even greater importance than finesse ratio is the effect of the hollow core on the air flowing through the fan. At lower speeds, the energy in the slipstream of the hollow column of air flowing through the fan blades entrains an inner column of air which flows through the hollow core. Thus the hollow core fan acting as an ejector produces more thrust by making use of energy which is wasted by the nacelle fan. As an aircraft utilizing a nacelle fan reaches high subsonic (about 550 m.p.h.) speeds, the air flow through the fan is considerably higher since it includes the air directly in front of the nacelle, and hence the fan chokes when flow of air at any point within the duct reaches sonic velocity. According to the subject invention, which utilizes a hollow core fan, the air directly in front of the hollow core and part of the air directly in front of the blades bypasses through the hollow core. Not only are choking and the setting up of shock waves greatly delayed, but also a higher net thrust is produced because the mass flow of air is increased by the flow of air through the hollow core.

A particular object of the invention is to provide a fan of the type described wherein the rotating parts are rotatably supported at their outer and inner peripheries by bearings supported in streamline ducts, the outer duct being supported on a wing, or stub wing, of the aircraft and the inner duct being supported at the inner ends of stators which are affixed at their outer ends to the outer duct.

These and other objects will be apparent from the following specifications and drawings, in which:

FIG. 2 is a transverse cross section along the line 2—2 of FIG. 1;

FIG. 3 is a front elevation, partly in cross section;

FIG. 7 is an enlarged cross sectional view showing a gas bearing such as may be used for supporting the turbine at the outer periphery of the fan and for supporting the inner ends of the fan blades; and, FIG. 8 is a diagrammatic "peeled away" view illustrating the arrangement of the openings and gas passages shown in FIG. 7.

Figure 1:
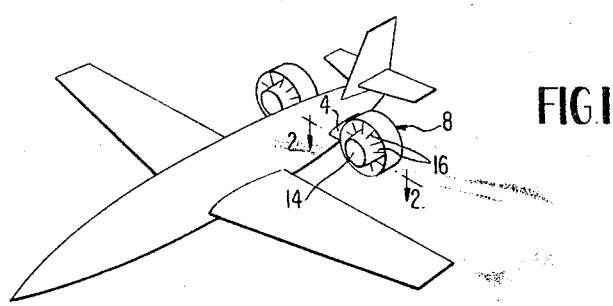
FIG. 1 is an elementary view, in perspective, of an airplane employing the subject hollow core ducted fans in tail location.
Figure 4:
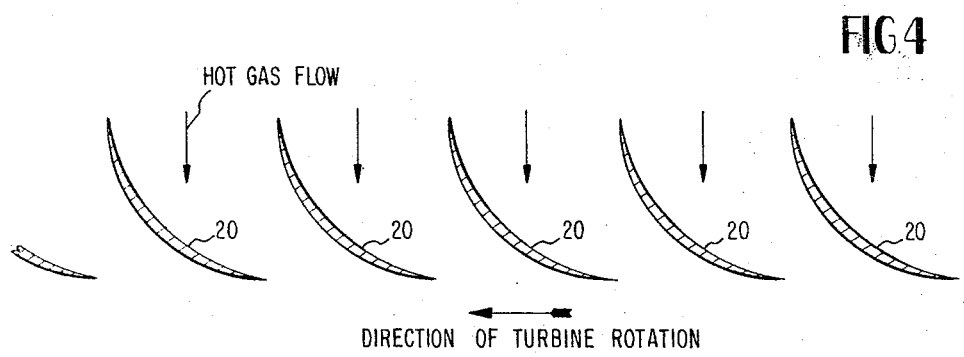
FIGS. 4 and 5 are diagrammatic cross-sectional views along the lines "4—4" and "5—5" of FIG. 3.
Figure 5:
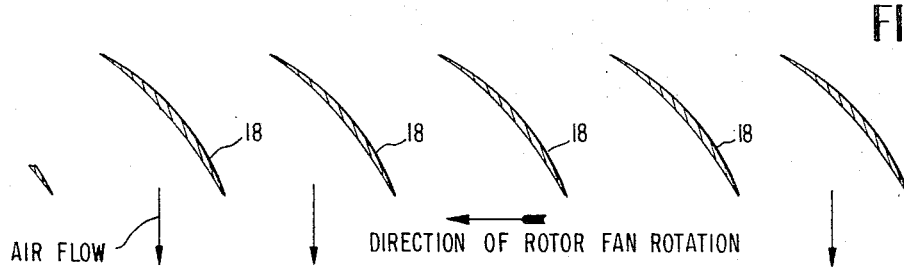
Figure 6:
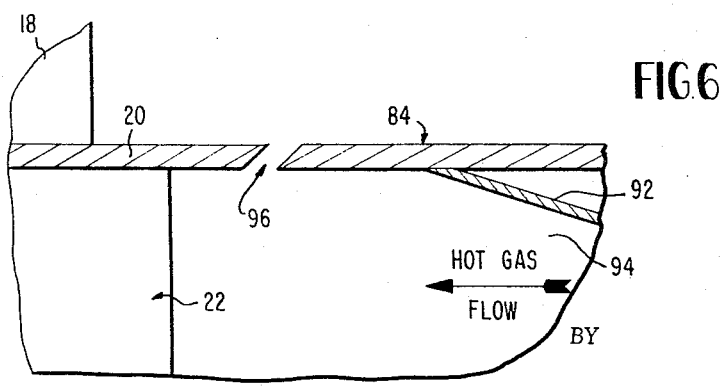
FIG. 6 is an enlarged fragmentary section showing the details within balloon "A" of FIG. 2.

Referring now to the drawings, in which like reference numerals denote similar elements, FIG. 1 shows a typical mode for mounting the bypass core ducted fan 2 with which this application is concerned. In FIG. 1, ducted fans 2 are shown mounted at the outer end of the stub wings 4 near the tail of an aircraft 6. Each ducted fan 2 includes an outer duct 8 and a fan unit 10 on the inner periphery of which is an inner duct 12 surrounding a hollow bypass core 14. It will be understood that the ducted fans may also be mounted elsewhere on an aircraft or ground effects machine, that they are driven by turbines detailed hereinafter which surround the fan units 10 and which are powered by hot gases derived from a hot gas generator in the aircraft, such as a jet engine (not shown). The turbines are supported at their peripheries by suitable bearings, such as the gas bearings described hereinbelow and which are the subject of my co-pending application entitled, Gas Bearing, filed concurrently herewith, it being understood that other suitable bearings may be utilized. If gas bearings are utilized, it is preferred that they receive gas or air under pressure derived from the hot gas generator in the aircraft. For example, if a jet engine is used to generate the hot gases, air under pressure could be bled off from the compressor. The supply of hot gases and air under pressure for propulsion and gas bearings is well known to those skilled in this art.

Referring now particularly to FIGS. 2 and 3, ducted fan 2 has an inner duct 12 rigidly connected to outer duct 8 by forward and rear stators 16 and 17 so that the two ducts form a concentric rigid unit. Inner duct 12 is preferably hollow and should be of streamline configuration, preferably as shown. Being of thin maximum wall thickness X with respect to its length L, the finesse ratio X/L of inner duct 12 is less than 10% so that it imposes very little drag even at high subsonic or supersonic speeds.

Affixed at their inner ends around the outer side of a bearing ring 24a described hereinafter are fan blades 18, the outer ends of which are affixed to a turbine base ring 20. Fan blades 18 are of conventional configuration. However, in a typical prior art fan having a hub, the pitch of the blades at their tip ends was in the range of from about 12° to 16° and the pitch at their hub ends was up to 75° so that up to 96% of the thrust of the blades at and near the hub was directed to the side. Also, in the prior art fans utilizing a hub, the blade overlap at and near the hub was such that, at high speeds, the air could not undergo the many changes in direction necessary to pass between the blades and also taking into account the blade density, the net result was that inner portion of the hub type fans was not only wasted but, particularly at high speeds, the drag at the inner portion was greater than the forward thrust produced there which was only about 10% of the lift of the blade. This problem could not be overcome practically by increasing hub diameter because then the finesse ratio would become so unfavorable that the nacelle would impose excessive drag and greatly reduce speed at which shock waves occur.

Utilizing the present invention, and assuming the pitch angle of fan blades at their outer ends to be in the range of about 15° to 20° (depending upon the intended operation speed), the pitch at the inner ends of blades 18 is preferably 45° to 50°, the result being that about 65% to 70% of the blade lift at inner end is forward thrust. In the subject invention the blade density at and near inner duct 16 is low, there is no overlap problem, and the efficiency in terms of net forward thrust is high.

The air flowing through the fan 10 forms a column with a hollow center defined by hollow core 14. At low subsonic speeds, the faster flowing air which passes through fan 10 entrains some of the air in the center before and especially after it flows through the hollow core 14, and hence a tractive force, with a resultant forward thrust, is created by increased mass flow through hollow core 14 and resultant increase in pressure differential acting on it. At high subsonic and supersonic speeds an additional phenomenon occurs. Here there is more air which must pass through the fan than the fan without excessive compression will permit. Hollow core 14 allows some of the air, which otherwise would have to pass through the fan, to expand and bypass the fan.

Surrounding and secured to the outer ends of fan blades 18 is the base ring 20 of a turbine 21, which includes an annular series of blades or buckets 22 whose outer ends are affixed to an outer ring 24 and the latter is rotatably supported in the outer wall 110 of outer duct 8 by a suitable bearing, such as gas bearing 26. Although other bearings may be utilized, the one claimed in my aforesaid co-pending application entitled, Gas Bearing, will be detailed, it being understood that the gas bearing 28 which rotatably supports the inner end of fan unit 10 on inner duct 12 is essentially the same as the outer gas bearing 26 and, hence, the same reference numerals will apply to bearing 28 as to bearing 26.

Referring particularly to FIGS. 2, 3, 4, 6, 7 and 8, a bearing wall 30 is inwardly spaced from outer wall 110 by spacer washers 32 and at its forward and rear ends, by end seal rings 34. Outer wall 28, bearing wall 30 and end seal rings 34 define an annular chamber 36 into which duct 38 leads. Duct 38 is supplied with air or other gas under pressure from a suitable source of supply, such as a compressor. Affixed on the inner side of bearing wall 30 are a series of axially spaced inwardly projecting annular hollow fins 40 and 42. Affixed to the inner sides of the inner walls 66 of the forward and rear stationary fins 40 and 42 are bearing bands 44, and around the intermediate portion of turbine outer ring 24 are axially-spaced bearing bands 46. Assuming fins 40 and 42 are made of ferrous metal, bearings bands 44 and 46 should be made of bearing metal such as oil impregnated bronze, to insure against seizing. Affixed around the outer side of turbine outer ring 24 are a series of axially spaced outwardly projecting annular hollow fins 48 which slidingly engage bearing bands 50. As with the previously described fins and bearing bands, they should be made of dissimilar metals having a low coefficient of friction so that even without the benefit of the pressure gas described below, a good oil lubricated bearing is provided.

The pneumatic arrangement provides a gas bearing as follows. Leading from annular chamber 36 into the interiors of hollow fins 40 are annular series of inlet holes 52 which pass through the outer wall 56 of hollow fins 40. The outer wall 56 of hollow fin 42 is blank and its interior takes no part in the pneumatic system. The front wall 58 of hollow fins 40 and 42 are blank, but the rear walls 60 of hollow fins 40 are each provided with an annular series of orifices 62. The inner walls 66 of hollow fins 40 and 42 are blank. Thus, each hollow fin 40 constitutes a plenum chamber supplied by gas under pressure through inlet holes 52. The rear wall 64 of hollow fin 42 is blank and plays no part in the pneumatics.

In the pneumatic system, hollow fins 48 function essentially as valved pistons. Their inner walls 68 are blank, as are their rear walls 70. However, their front walls 72 are each provided with an annular series of diametrically spaced large openings 74, and their radially outward walls 76 are provided with an annular series of circumferentially spaced outlet ports 78. When the outer ring 24 of turbine 21 moves rearwardly with respect to bearing wall 30 to the position shown in FIG. 7, outlet ports 78 communicate with the atmosphere via annular series of outlets 80 which pass through bearing wall 30, spacer washers 32 and the outer wall 110 of the outer duct 10. Most of outlets 80 vent directly to the atmosphere, and a few vent into the interior of stub wing 4 which, in turn, is suitably vented to the atmosphere to relieve pressure which might otherwise build up therein.

When the outer ring 24 of turbine 21 moves forwardly of the position shown in FIG. 7, outlet ports 78 are blanked by the surfaces of bearing bands 50 so that, except for the leakage between the rubbing surfaces of the hollow fins and the bearing bands, the gas issuing rearwardly via restricted orifices has no escape route, and gas pressure builds up against the forwardly facing surfaces 70 of hollow fins 48, thereby forcing the latter, piston-like, to the rear. As soon as the outer ring 24 of turbine 21 and the hollow fins 48 thereon move rearwardly enough to open connecting cracks between outlet ports 78 and outlets 80, the gas pressure which formerly forced hollow fins 48 rearwardly is relieved. Thereupon, when the outer rear corners 81 of hollow fins 48 move rearwardly beyond the rear edges of outlets 80, air is trapped in the then closed chamber 83 between the rear walls 70 of hollow fins 48 and the front walls 58 of hollow rings 40, and thus further rearward movement of the outer turbine ring 24 relative to bearing walls 30 is pneumatically resisted. The air leaking between the rubbing surfaces of the hollow fins and bearing rings provides a cushion and holds the rubbing surfaces apart sufficiently so that there is little friction in the radial direction of the bearing, and the piston-like action of the hollow fins provides a pneumatic, nearly friction-free axial bearing for the turbine and fan.

The outer wall 110 of outer duct 8 meets at its leading edge with an inner wall 84 and they together define an annular manifold 86 for hot gas under pressure supplied by a duct 88 from the hot gas generator previously mentioned. Partitions 90 and 92 define a nozzle 94 through which the hot gas is ejected against turbine buckets 22. As detailed in FIG. 6, a slanted gap provided between inner wall 84 of the outer duct and turbine base ring 20 allows a small amount of air to be drawn by suction of hot gas flow.

As previously stated, the gas bearing 28 which rotatably supports the inner ends of fan blades 18 on inner duct 12 is essentially the same as bearing 26. Bearing ring 24a, to which the inner ends of blades 18 are affixed corresponds to outer ring 24 previously described, and annular chamber corresponds to the annular chamber 36 surrounding bearing 26. Duct 38a, through which air or other gas under pressure is supplied from the same source as that for duct 38, leads through one of the forward stator blades 16. Inner duct 12, like outer duct 8, is hollow, but of considerably more length fore and aft for optimum finesse ratio, and consists of an inner wall 100 through which outlets (not shown) corresponding to outlets 80 (FIGS. 7 and 8) vent directly into hollow core 14. Extending rearwardly from leading edge 102 of inner duct 12 on the outer side thereof is a shell wall 104 to which the inner ends of forward stator blades 16 are affixed, the outer ends of stator blades 16 being affixed to the inner side of inner wall 84 of outer duct 8. Extending forwardly from trailing edge 106 of inner duct 12 is a shell wall 108 to which the inner ends of rear stator blades 17 are affixed, the outer ends of blades 17 being affixed to the inner wall 82 on the rear end of outer duct 8.

In the embodiment detailed hereinbefore, it is contemplated that hollow core 14, as measured diametrically across from the fore-and-aft middle of inner wall 100 of inner duct 12, occupies about 42.5% of the diameter of the ducted fan, which is measured diametrically across from the fore-and-aft middle of the outer shell wall 110 of outer duct 8, the fan unit 10 occupying about 42.5%, the inner duct maximum thicknesses about 5% and the outer duct maximum thicknesses about 10%.

The invention is not limited to the details of the structures disclosed and described herein, but is intended to cover all substitutions, modifications and equivalents within the scope of the following claims.

I claim:

1. A ducted fan for aircraft, comprising a concentric pair of radially spaced hollow cylindrical ducts of relatively small and large diameter, respectively, radially extending stator blades rigidly connecting said ducts to one another, first bearing means on the small diameter duct, a fan surrounding the small diameter duct and rotatably supported by said first bearing means for rotation about an axis in common with said ducts, turbine means affixed to and surrounding said fan for rotating the latter, and second bearing means in the large diameter duct rotatably supporting said turbine means, said small diameter duct defining a hollow substantially cylindrical axial passage substantially open from front to rear.

2. The combination claimed in claim 1, said small diameter duct comprising a hollow shell enclosing said first bearing means.

3. The combination claimed in claim 2, said hollow shell being of streamlined configuration with a thickness-to-length finesse ratio of less than about 10%.

4. The combination claimed in claim 3, said large diameter duct comprising a hollow shell enclosing said second bearing means and the leading side of said turbine means, and means including an annular manifold within the last-named hollow-shell for distributing gas under pressure to said turbine means.

5. A ducted fan assembly for aircraft, comprising a concentric pair of radially spaced hollow cylindrical ducts of relatively small and large diameter, respectively, radially extending stator blades rigidly connecting said ducts to one another, first gas bearing means enclosed within the small diameter shell, a fan surrounding the small diameter duct and rotatably supported on said first gas bearing means for rotation about an axis in common with said ducts, turbine means affixed to and surrounding said fan for rotating the latter, second gas bearing means in said large diameter duct rotatably supporting said turbine means, said large diameter shell enclosing said second gas bearing means and the forward side of said turbine means, said small diameter duct defining a hollow substantially cylindrical axial passage substantially open from front to rear, and means for supporting one of said ducts on a fixed part of an aircraft.

6. The combination claimed in claim 5, said axial passage occupying about 42.5% of the frontal diameter of said assembly, the radial thickness of said small diameter duct occupying about 5% of said frontal diameter, said fan occupying about 42.5% of said frontal diameter, and said large diameter duct occupying about 10% of said frontal diameter.

7. The combination claimed in claim 5, means in said large diameter duct for conducting gas under pressure to said second gas bearing means, and conduit means supported by one of said stator blades for conducting gas under pressure to said first gas bearing means.

8. The combination claimed in claim 7, said one stator blade being hollow, said conduit means being within said one stator blade.

9. The combination claimed in claim 5, said stator blades being disposed both forwardly and rearwardly of said fan, said small diameter duct having leading and trailing edges respectively extending forwardly of the forward stator blades and rearwardly of the rear stator blades.

10. The combination claimed in claim 9, said small diameter duct being a streamlined body with a thickness-to-length finesse ratio of less than about 10%.

11. A ducted fan for aircraft, comprising
a concentric pair of hollow cylindrical ducts of relatively large and small diameter, respectively,
radially extending stator blades rigidly connecting said ducts to one another,
bearing means on the small diameter duct,
a fan surrounding the small diameter duct and having blades with inner ends supported on the bearing means for rotation with respect to the inner duct,
a ring concentric with the ducts, said ring surrounding and affixed to outer ends of the fan blades,
turbine buckets on the ring,
means in the outer duct for feeding propulsion gas to the turbine buckets,
and means for fixedly supporting one of said ducts on a fixed part of an aircraft.

References Cited by the Examiner
UNITED STATES PATENTS 2,864,552  12/1958  Anderson _____ 230—116
3,138,350   6/1964  Lovett _____ 230—116 X ROBERT M. WALKER, *Primary Examiner.*